A. RODGERS.
SAW-MILL.

No. 171,173.

2 Sheets—Sheet 1.

Patented Dec. 14, 1875.

Witnesses:

Inventor.
Alexander Rodgers
By A. R. Brown
Atty.

2 Sheets—Sheet 2.

A. RODGERS.
SAW-MILL.

No. 171,173. Patented Dec. 14, 1875.

Witnesses:

Inventor:
Alexander Rodgers,
By A. R. Brown
atty.

UNITED STATES PATENT OFFICE.

ALEXANDER RODGERS, OF MUSKEGON, MICHIGAN.

IMPROVEMENT IN SAW-MILLS.

Specification forming part of Letters Patent No. 171,173, dated December 14, 1875; application filed March 20, 1875.

*To all whom it may concern:*

Be it known that I, ALEXANDER RODGERS, of Muskegon, in the county of Muskegon and State of Michigan, have invented certain new and useful Improvements in Saw-Mills; and I do hereby declare that the following is a full, clear, and exact description thereof, which will enable others skilled in the art to which it appertains to make and use the same, reference being had to the accompanying drawings, and to the letters of reference marked thereon, which form a part of this specification, similar letters indicating corresponding parts in the different figures.

This invention relates to that class of saw-mills in which a series of saws are placed side by side in a vertically-reciprocating frame, which is of sufficient width to admit of one or more logs passing through it; but owing to the immense force exerted upon the upper and lower pieces of this frame, which are technically called "girts," by straining the whole series of saws therein through the agency of wedges driven through a loop attached to the upper end of each saw and over the girt, it has been found best to keep the frames as narrow as possible; but in doing this an impediment was met in the knots, bends, and projections upon many of the logs, which, coming in contact with the stiles, sprung them or created so much friction as to stop the mill, or cause the breakage of some portion of the mechanism, and compelled the use of a much wider frame than was absolutely necessary to hold the saws, and as there was the same strain upon the girts, which were much longer between their supports, it was, of course, necessary to make them heavier and of greater depth, thus increasing their weight in a great degree, and adding proportionally to the expense of construction, and to the power required to drive them; and the object of this invention is to obviate this necessity for an extra width of saw-frame by attaching to the side pieces or stiles of the frame cutters, which, as the frame reciprocates, cut away all projecting parts of the log, as will be hereinafter fully described, and then pointed out in the claim.

Figure 1:
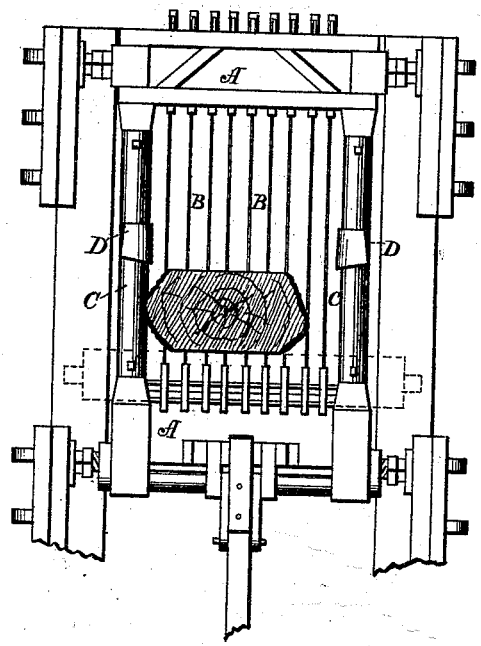
Figure 2:
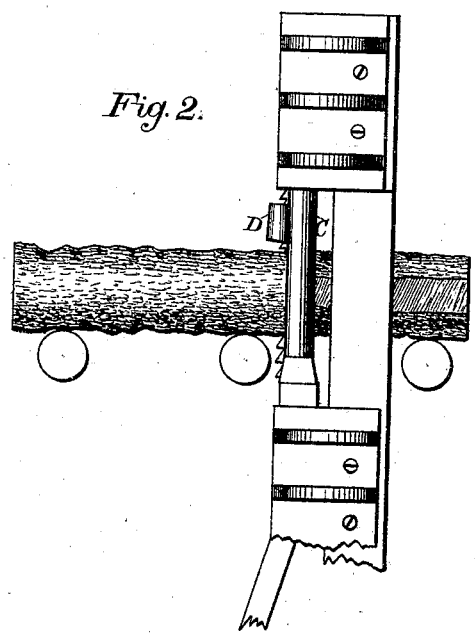
Figure 4:
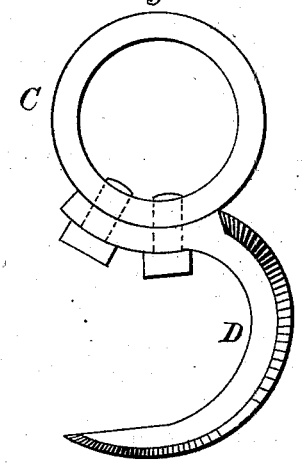
Figure 3:
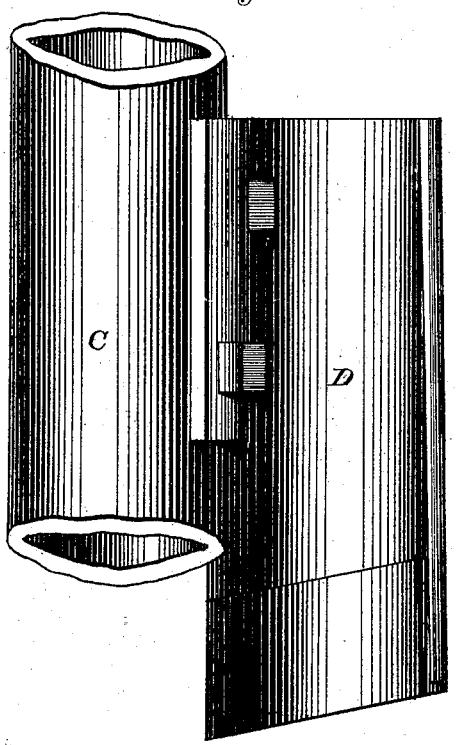
Figure 5:
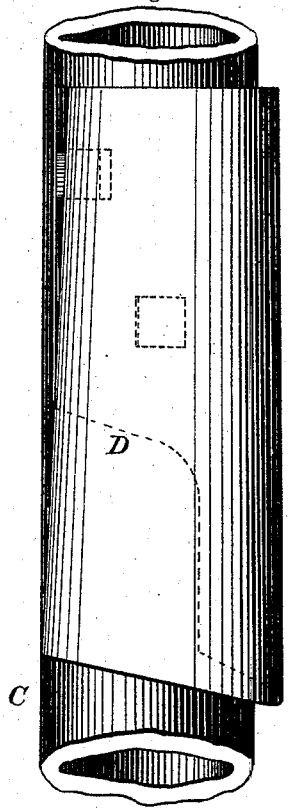

Figure 1 is a front view of a gang with the cutters attached. Fig. 2 is a side elevation of Fig. 1. Fig. 3 is an enlarged side view of the cutter and stile. Fig. 4 shows the relative positions of the cutter and stile, looking downward. Fig. 5 is a front view of the cutter and a part of the stile.

These views present the device in the form which repeated experiments have shown to be best adapted to the work to be performed, although its shape may be changed, as well as the means of securing it in position upon the stile. The method of constructing the latter, being various, will, of course, entail changes in the shape and method of securing the cutters.

A represents the girts of the saw-frame; B, the saws, and C the stiles, all of which parts may be constructed in any of the ordinary forms now in use, as the especial shape or arrangement of these devices forms no part of this invention. Attached to the stiles C, by means of bolts or other suitable devices, are the cutters D, which may be of the curved form shown in the drawing, or of such other shape as will secure the same result—that is, cut away the wood in front of the stile, so as to allow the log to pass freely through the saw-frame without touching the stiles.

It will be apparent that the device may be applied to other saw-frames as well as to those containing gangs of saws, if desired.

Having thus described my invention, I claim as new, and desire to secure by Letters Patent of the United States, the following:

The combination, with the stiles or side supports of a saw-frame, of the cutters D, for removing knots or projections from the log, substantially as set forth.

In testimony that I claim the foregoing as my own I hereunto affix my signature in presence of two witnesses.

ALEXANDER RODGERS.

Witnesses:
 E. S. LATIMER,
 JOHN B. SMALLEY.